United States Patent
Yada et al.

(10) Patent No.: US 11,970,603 B2
(45) Date of Patent: Apr. 30, 2024

(54) CHLORINATED POLYOLEFIN RESIN AND METHOD FOR PRODUCING THE SAME

(71) Applicant: NIPPON PAPER INDUSTRIES CO., LTD., Kita-ku (JP)

(72) Inventors: Minoru Yada, Kita-ku (JP); Naosuke Komoto, Kita-ku (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 558 days.

(21) Appl. No.: 17/261,698

(22) PCT Filed: Jul. 22, 2019

(86) PCT No.: PCT/JP2019/028616
§ 371 (c)(1),
(2) Date: Jan. 20, 2021

(87) PCT Pub. No.: WO2020/022251
PCT Pub. Date: Jan. 30, 2020

(65) Prior Publication Data
US 2021/0292530 A1  Sep. 23, 2021

(30) Foreign Application Priority Data
Jul. 25, 2018  (JP) ................. 2018-139831

(51) Int. Cl.
*C08F 8/22* (2006.01)
*C08L 23/16* (2006.01)
*C08L 23/28* (2006.01)
*C08L 23/30* (2006.01)

(52) U.S. Cl.
CPC ............. *C08L 23/28* (2013.01); *C08F 8/22* (2013.01); *C08L 23/16* (2013.01); *C08L 23/30* (2013.01); *C08L 2201/54* (2013.01); *C08L 2205/025* (2013.01)

(58) Field of Classification Search
CPC ...... C08F 8/18; C08F 8/20; C08F 8/22; C08L 23/28; C08L 23/283; C08L 23/286; C08L 2205/02; C08L 2205/025
See application file for complete search history.

(56) References Cited

U.S. PATENT DOCUMENTS

| | | | |
|---|---|---|---|
| 2007/0224435 A1 | 9/2007 | Nishijima et al. | |
| 2010/0227970 A1 | 9/2010 | Nishioka | |
| 2020/0385557 A1* | 12/2020 | Kono | .................... C08F 255/04 |

FOREIGN PATENT DOCUMENTS

| | | | | |
|---|---|---|---|---|
| CN | 1961007 A | 5/2007 | | |
| CN | 101415770 A | 4/2009 | | |
| JP | 3-199206 A | 8/1991 | | |
| JP | 5-222117 A | 8/1993 | | |
| JP | 2000-119591 A | 4/2000 | | |
| JP | 2006-104431 A | 4/2006 | | |
| JP | 2007-91933 A | 4/2007 | | |
| JP | 2015-209450 A | 11/2015 | | |
| JP | 6660517 B1 | 3/2020 | | |
| WO | WO 2007/113922 A1 | 10/2007 | | |
| WO | WO-2018168753 A1 * | 9/2018 | ............ | C08F 255/04 |

OTHER PUBLICATIONS

Combined Chinese Office Action and Search Report dated Jan. 5, 2023 in Chinese Patent Application No. 201980049377.7 (with English Translation), 9 pages.
International Search Report dated Sep. 10, 2019 in PCT/JP2019/028616 filed on Jul. 22, 2019, 1 page.
Office Action dated Jun. 20, 2023, in corresponding Japanese Patent Application No. 2020-007867 (with English Translation), 3 pages.

* cited by examiner

Primary Examiner — Marc S Zimmer
Assistant Examiner — Jeffrey S Lenihan
(74) Attorney, Agent, or Firm — Oblon, McClelland, Maier & Neustadt, L.L.P.

(57) ABSTRACT

A chlorinated polyolefin resin may have excellent adhesion and can be produced without using a chlorinated solvent and without producing by-products through a series of production processes. Such a chlorinated polyolefin resin may be a chlorinated polyolefin resin having an amount of chlorine of 1% by weight to 45% by weight obtained by chlorinating a raw material composition in the absence of an organic solvent, wherein the raw material composition includes at least a polyolefin A or an acid-modified product thereof which has fluidity at 40° C. or less and a polyolefin B or an acid-modified product thereof which has a melting point of more than 40° C. and 150° C. or less.

8 Claims, No Drawings ent invention relates to a chlorinated polyolefin
CHLORINATED POLYOLEFIN RESIN AND METHOD FOR PRODUCING THE SAME

FIELD

The present invention relates to a chlorinated polyolefin resin and a method for producing the same.

BACKGROUND

In recent years, the regulations of the chemical substances in inks used for food packaging films have been tightened. For example, the negative list of the chemical substances included in inks has been enacted in Japan. In addition, the regulations in which the substances capable of being used for inks for food packaging are listed in a positive list have been introduced in the EU area. It is considered that the chemical substance regulation in this field will be further tightened in the future. In particular, it is considered that regulations of halogenated solvents that negatively affect the human body will be stricter.

The chlorinated polyolefin is generally produced by dissolving a polyolefin in an organic solvent and thereafter a chlorine addition reaction is performed (for example, refer to Patent Literature 1). During the chlorine addition reaction, the chlorination of the organic solvent also occurs and a large amount of by-products are generated. Therefore, in this process, a chlorinated solvent such as chloroform, which is particularly difficult to cause a chlorine addition reaction among organic solvents, is used. The chlorinated solvent used in the chlorine addition reaction process is effectively removed and recovered from the chlorinated polyolefin by distillation under reduced pressure or the like. Therefore, the chlorinated polyolefin, which is a product, includes almost no chlorinated solvent.

CITATION LIST

Patent Literature

Patent Literature 1: Japanese Patent Application Laid-open No. 2015-209450

SUMMARY

Technical Problem

However, the chlorinated solvent in the chlorine addition reaction process has been usually used. In view of the recent tightening of the regulations of the chemical substances, the development of chlorinated polyolefins that do not use the chlorinated solvents at all in the chlorinated polyolefin production process has been required.

Even when an organic solvent is used instead of the chlorinated solvent, the chlorinated solvent of a halogenated solvent is advantageously produced as the by-product caused by the chlorine addition reaction during the chlorination process as described above.

An object of the present invention is to provide a chlorinated polyolefin resin having excellent adhesion that can be produced without using a chlorinated solvent and without producing by-products through a series of production processes.

Solution to Problem

Intensive studies of the inventors of the present invention for the object described above have found that the object described above can be solved by two or more polyolefins combined a polyolefin A or an acid-modified product thereof with a polyolefin B or an acid-modified product thereof. The polyolefin A has excellent fluidity. The polyolefin B has a relatively high molecular weight capable of exhibiting cohesive force. As a result, the present invention has been attained.

The inventor of the present invention provides the following [1] to [7].

[1] A chlorinated polyolefin resin having an amount of chlorine of 1% by weight to 45% by weight obtained by chlorinating a raw material composition in the absence of an organic solvent, wherein the raw material composition includes at least a polyolefin A or an acid-modified product thereof which has fluidity at 40° C. or less and a polyolefin B or an acid-modified product thereof which has a melting point of more than 40° C. and 150° C. or less.

[2] The chlorinated polyolefin resin according [1] as described, wherein a melt viscosity at 80° C. is less than 100,000 mPa·s.

[3] The chlorinated polyolefin resin according to [1] or [2] as described, wherein a weight average molecular weight of the polyolefin B is less than 250,000.

[4] The chlorinated polyolefin resin according to any one of claims [1] to [3] as described above, wherein the raw material composition includes at least the polyolefin A and the acid-modified product of the polyolefin B or includes at least the acid-modified product of the polyolefin A and the acid-modified product of the polyolefin B.

[5] A resin composition including the chlorinated polyolefin resin according to any one of [1] to [4] as described above, and an organic solvent.

[6] An aqueous dispersion including the chlorinated polyolefin resin according to any one of [1] to [4] as described above, and water.

[7] A method for producing the chlorinated polyolefin resin according to any one of [1] to [4] as described above, the method including chlorinating the raw material composition in the absence of an organic solvent, wherein the raw material composition includes at least the polyolefin A or the acid-modified product thereof and the polyolefin B or the acid-modified product thereof.

Advantageous Effects of Invention

According to the present invention, the chlorinated polyolefin resin having excellent adhesion that can be produced without using the chlorinated solvent and without producing the by-products through a series of the production processes can be provided.

DESCRIPTION OF EMBODIMENTS

Hereinafter, the present invention will be described in detail in line with its preferable embodiments.

In the present specification, the phrase "has fluidity at 40° C. or less" means that the viscosity measured by a cylindrical rotary viscometer or a cone plate viscometer at 40° C. is 100,000 mPa or less. In addition, the notation "AA % to BB %" represents AA % or more and BB % or less.

[1. Chlorinated Polyolefin Resin]

The chlorinated polyolefin resin according to the present invention is obtained by chlorinating a raw material composition including at least the polyolefin A or the acid-modified product thereof having fluidity at 40° C. or less and the polyolefin B or the acid-modified product thereof having a melting point of more than 40° C. and 150° C. or less in the absence of an organic solvent. The amount of chlorine in the chlorinated polyolefin resin is 1° by weight to 45° by weight.

The chlorinated polyolefin resin according to the present invention can be produced by being chlorinated in the absence of an organic solvent because the raw material composition before chlorination includes the polyolefin A or the acid-modified product thereof. In addition, the chlorinated polyolefin resin according to the present invention can serve as a chlorinated polyolefin resin that can be applicable to, for example, use in an ink because the raw material composition before chlorination includes the polyolefin B or the acid-modified product thereof.

The chlorinated polyolefin resin according to the present invention may be referred to as a chlorinated polyolefin resin obtained through acid modification treatment (hereinafter, described as an "acid-modified chlorinated polyolefin resin" for convenience). The acid-modified chlorinated polyolefin resin can control the polarity of the chlorinated polyolefin resin which is obtained depending on the amount of the acid modification (hereinafter also described as "graft weight"). Therefore, the chlorinated polyolefin resin according to the present invention is applicable to adherends having various polarities.

The acid modification treatment may be subjected to (1) the polyolefin A and/or the polyolefin B, (2) a mixture of polyolefin A and polyolefin B before the chlorination treatment (hereinafter, described as a "polyolefin mixture" for convenience), or (3) the chlorinated polyolefin resin after the chlorination treatment. The acid modification treatment may be any one of the treatments of (1) to (3), or may be a combination of (1) and (2) or a combination of (1) and (3). Among them, the acid modification treatment is preferably subjected to (1) or (2), that is, the polyolefin B or the polyolefin mixture.

In the present specification, the raw material composition including the polyolefin mixture subjected to the acid modification treatment or the polyolefin B subjected to the acid modification treatment is also referred to as an "acid-modified raw material composition".

Hereinafter, the acid modification treatment will be described.

The method of the acid modification treatment is not particularly limited and can be performed by known methods. Examples of the method include a solution method in which the polyolefin B or the polyolefin mixture and an α,β-unsaturated carboxylic acid or a derivative thereof are heated and dissolved in a solvent such as toluene and a radical generator is added thereto; and a melting and kneading method in which the polyolefin B or the polyolefin mixture, the α,β-unsaturated carboxylic acid or the derivative thereof, and the radical generator are blended and kneaded therewith using a Banbury mixer, a kneader, or an extruder.

Examples of the α,β-unsaturated carboxylic acid or the derivative thereof include maleic acid, maleic anhydride, fumaric acid, citraconic acid, citraconic anhydride, mesaconic acid, itaconic acid, itaconic anhydride, aconitic acid, aconitic anhydride, hymic anhydride, (meth)acrylic acid, and (meth)acrylates. Among these acids or derivatives thereof, maleic anhydride is preferable.

The α,β-unsaturated carboxylic acid or the derivative thereof may be at least one compound selected from the α,β-unsaturated carboxylic acids and derivatives thereof and may be a combination of one or more α,β-unsaturated carboxylic acids and one or more derivatives thereof, a combination of two or more α,β-unsaturated carboxylic acids, or a combination of two or more derivatives of the α,β-unsaturated carboxylic acids.

The introduced amount (graft weight) of the α,β-unsaturated carboxylic acid or the derivative thereof is preferably 0.1% by weight to 10% by weight, and more preferably 0.5% by weight to 5% by weight in the case where the acid-modified raw material composition is determined to be 100% by weight. A graft weight of 0.1% by weight or more allows the adhesiveness of the obtained acid-modified chlorinated polyolefin resin to materials such as a metal adherend to be maintained. A graft weight of 10% by weight or less allows the generation of unreacted products of the graft to be prevented and sufficient adhesiveness to a resin adherend to be obtained.

The introduced amount (graft weight) of the α,β-unsaturated carboxylic acid or the derivative thereof is a value measured by an alkali titration method.

The radical generator may be appropriately selected from known radical generators. Of the radical generators, organic peroxide compounds are preferable. Examples of the organic peroxide compounds include di-t-butyl peroxide, dicumyl peroxide, t-butylcumyl peroxide, benzoyl peroxide, dilauryl peroxide, cumene hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxybenzoate, t-butylperoxyisobutyrate, t-butylperoxy-3,5,5-trimethylhexanoate, t-butylperoxy-2-ethylhexanoate, t-butylperoxyisopropylcarbonate, cumylperoxyoctoate, and 2,5-dimethyl-2,5-di(t-butylperoxy)hexane. Of these peroxides, dicumyl peroxide, di-t-butyl peroxide, dilauryl peroxide, and 2,5-dimethyl-2,5-di(t-butylperoxy)hexane are preferable.

The amount of the radical generator to be added is preferably 1% by weight to 100% by weight and more preferably 10% by weight to 50% by weight relative to the total (weight) of the amount of the α,β-unsaturated carboxylic acid or the derivative thereof to be added and the amount of (meth)acrylate ester to be added. The radical generator to be added in an amount of 1% by weight or more allows sufficient graft efficiency to be maintained. The radical generator to be added in an amount of 100% by weight or less allows decrease in the weight average molecular weight of the acid-modified raw material composition to be prevented.

The chlorinated polyolefin resin according to the present invention is obtained by chlorinating the raw material composition. This allows adhesion to nonpolar resin substrates and compatibility with other components to be improved.

Examples of the chlorination method include a method of blowing chlorine gas into the raw material composition to introduce chlorine atoms into the raw material composition.

In the present invention, use of the chlorinated solvent such as chloroform or methylene chloride or other organic solvents is not necessary at the time of blowing chlorine gas. This is because the raw material composition includes the polyolefin A or the acid-modified product thereof having fluidity at 40° C. or less which dissolves chlorine gas. This allows the polyolefin B or the acid-modified product thereof to react with the chlorine gas.

Blowing of chlorine gas may be performed under irradiation with ultraviolet rays and may be performed either in the presence of or in the absence of a radical reaction initiator. The pressure at which chlorine gas is blown is not limited and may be under normal pressure or under pressurized pressure. The temperature at which chlorine gas is blown is not particularly limited and is usually 50° C. to 140° C.

As the radical reaction initiator, organic peroxide compound or azonitriles such as 2,2-azobisisobutyronitrile may be used. The details of the organic peroxide compounds will be described later.

The chlorinated polyolefin resin according to the present invention is obtained by introducing chlorine atoms into the polyolefin mixture or the acid-modified products thereof, a mixture of the acid modified products of the polyolefin A and the polyolefin B, or a mixture of the acid-modified product of the polyolefin A and the polyolefin B.

The amount of chlorine in the chlorinated polyolefin resin according to the present invention is 1% by mass to 45% by mass, preferably 10% by mass to 45% by mass, and more preferably 20% by weight to 45% by weight. By setting the amount of chlorine in the above range, the polarity of the chlorinated polyolefin resin can be controlled to a certain range. Therefore, the chlorinated polyolefin resin according to the present invention can provide excellent compatibility with other resins in paints and sufficient adhesiveness to the nonpolar substrate such as a polyolefin substrate.

The amount of chlorine in the chlorinated polyolefin resin is a value measured in accordance with JIS-K7229.

The amount of chlorine varies depending on factors such as the type of the polyolefin resin, a reaction scale, and a reaction apparatus. Therefore, the amount of the chlorine can be controlled while monitoring the blowing amount of chlorine and time.

Examples of the organic peroxide compound include di-t-butyl peroxide, dicumyl peroxide, t-butylcumyl peroxide, benzoyl peroxide, dilauryl peroxide, cumene hydroperoxide, t-butyl hydroperoxide, 1,4-bis[(t-butylperoxy)isopropyl]benzene, 1,1-bis (t-butylperoxy)-3,5,5-trimethylcyclohexane, 1,1-bis(t-butylperoxy)-cyclohexane, cyclohexanone peroxide, t-butylperoxybenzoate, t-butylperoxyisobutyrate, t-butylperoxy-3,5,5-trimethylhexanoate, t-butylperoxy-2-ethylhexanoate, t-butylperoxyisopropyl carbonate, and cumylperoxyoctoate. Of these organic peroxide compounds, di-t-butyl peroxide, dicumyl peroxide, and dilauryl peroxide are preferable.

The radical generator may be a single radical generator alone or may be a combination of a plurality of types of the radical generators.

The lower limit value of the weight average molecular weight of the chlorinated polyolefin resin is preferably 5,000 or more, more preferably 7,000 or more, and further preferably 8,000 or more. The chlorinated polyolefin resin having a molecular weight of 5,000 or more allows the resin to have cohesive force and to exhibit adhesion to adherends. The upper limit value of the weight average molecular weight is preferably 100,000 or less, more preferably 60,000 or less, and further preferably 40,000 or less. The chlorinated polyolefin resin having a molecular weight of 100,000 or less allows the chlorinated polyolefin resin to have compatibility with other resins and solubility in a solvent and to be applicable to paints and inks.

The weight average molecular weight of the chlorinated polyolefin resin is preferably 5,000 to 100,000, more preferably 7,000 to 60,000, and further preferably 8,000 to 40,000.

The weight average molecular weight is a value determined from a standard polystyrene calibration curve obtained by a gel permeation chromatography (GPC) method.

[1-1. Polyolefin A]

The polyolefin A is a polyolefin having fluidity at 40° C. or less. By including the polyolefin A, the melt viscosity during the chlorination reaction can be reduced and chlorination can be performed without using the organic solvent.

More specifically, as the polyolefin A, a polyolefin having a viscosity at 40° C. of 100,000 mPa·s or less is preferable, and a polyolefin having a viscosity at 40° C. of 60,000 mPa·s or less is more preferable. The lower limit value of the viscosity is not particularly limited and is usually 100 mPa·s or more.

The viscosity at 40° C. is a value measured by a cone plate type viscometer (manufactured by BROOKFIELD Corporation, model: CAP200H).

The polyolefin A may be a polyolefin satisfying the physical properties described above. Examples thereof include an ethylene-propylene copolymer, hydrogenated polybutadiene, an ethylene-butene copolymer, an ethylene-octene copolymer, a propylene-butene copolymer, and α-olefin derivatives.

These polyolefins may be commercially available products.

The polyolefin A may be used singly or in combination of two or more thereof.

[1-2. Polyolefin B]

The polyolefin B is a polyolefin having a melting point of more than 40° C. and 150° C. or less. By including the polyolefin B, the chlorinated polyolefin resin can be applicable for use in ink and the like.

The melting point is a value measured in accordance with JIS K7121 (1987) using a DSC measurement apparatus (for example, "DISCOVERY DSC2500", manufactured by TA Instruments Japan, Inc.). More specifically, about 5 mg of a sample is maintained in a heated and melted state at 200° C. for 10 minutes. The temperature of the sample is lowered at a rate of 10° C./min. After the temperature reaches to −50° C., the sample is stably maintained for 5 minutes. Thereafter, the temperature is raised to 200° C. at a rate of 10° C./min, and at the time of melting, a melting peak temperature as the melting point is measured. The temperature at the top of a melting peak is defined as a melting peak temperature.

More specifically, the polyolefin B is preferably a polyolefin having a weight average molecular weight of 8,000 or more and less than 250,000, more preferably a polyolefin having a weight average molecular weight of 8,000 or more and less than 200,000, and further preferably a polyolefin having a weight average molecular weight of 10,000 or more and less than 100,000.

The weight average molecular weight is a value determined from a standard polystyrene calibration curve obtained by a gel permeation chromatography (GPC) method.

The polyolefin B may be a polyolefin satisfying the physical properties described above. Of the above polyolefins, polyolefins obtained by using a Ziegler-Natta catalyst or a metallocene catalyst as a polymerization catalyst are preferable, polypropylene resins or polyolefins obtained by copolymerizing propylene and an α-olefin (for example, ethylene, butene, 3-methyl-1-butene, and 3-methyl-1-heptene) obtained by using a Ziegler-Natta catalyst or a metallocene catalyst as a polymerization catalyst are more preferable, propylene-based random copolymers obtained by using the metallocene catalyst as the polymerization catalyst are further preferable, and polypropylene, ethylene-propylene copolymers, propylene-butene copolymers, or ethylene-propylene-butene copolymers obtained by using the metallocene catalyst as the polymerization catalyst are further more preferable. Use of the metallocene catalyst provides the polyolefin having characteristics of narrow molecular weight distribution, excellent random copolymerizability, narrow composition distribution, and a wide range of copolymerizable comonomers.

These polyolefins may be commercially available products.

Here, the propylene-based random copolymer refers to polypropylene or a polyolefin obtained by random copolymerization of propylene and an α-olefin. Examples of the propylene-based random copolymer include polypropylene, an ethylene-propylene copolymer, a propylene-butene copolymer, an ethylene-propylene-diene copolymer, and an ethylene-propylene-butene copolymer.

The (co)polymer constituting the polyolefin B may be a single (co)polymer or a combination of a plurality of (co)polymers.

As the metallocene catalyst, known metallocene catalysts can be used. Example of the metallocene catalyst include catalysts obtained by combining the component (1), the component (2), and, if necessary, the component (3) described below. Among the catalysts, the metallocene catalyst is preferably a catalyst obtained by combining the components (1), the component (2), and, if necessary, component (3) described below.

Component (1): A metallocene complex that is the compound of a transition metal belonging to Groups 4 to 6 of the periodic table having at least one conjugated five-membered ring ligand.
Component (2): Ion-exchangeable layered silicate.
Component (3): An organoaluminum compound.

The structure of the polyolefin may be any of an isotactic structure, an atactic structure, a syndiotactic structure, and the like that a general macromolecule compound can form. Among these structures, a polyolefin having the isotactic structure, which can be formed in the case where the metallocene catalyst is used, is preferable in view of adhesion to the polyolefin substrate, in particular, adhesion at low-temperature drying.

As the component composition of the polyolefin, the propylene constituent unit content ratio is preferably 30% by weight or more, more preferably 40% by weight or more, and further preferably 50% by weight or more. The polyolefin having a propylene component of 30% by weight or more may provide more excellent adhesion (adhesiveness) to the polypropylene substrate.

The propylene constituent unit content ratio of the polyolefin may be a ratio of the raw material to be used or a value calculated by NMR analysis.

In addition, instead of the polyolefin B described above, the acid-modified product obtained by subjecting the polyolefin B to acid modification may be used. By subjecting to the acid modification treatment, the polarity of the chlorinated polyolefin resin can be controlled by controlling the graft weight. Therefore, the chlorinated polyolefin resin can be applied to adherends having various polarities.

The details of the acid modification treatment are as described above.

[1-3. Ratio]

The ratio (A/B) of the polyolefin A or the acid-modified product thereof to the polyolefin B or the acid-modified product thereof in the raw material composition or the acid-modified raw material composition is not particularly limited and is usually 10/90 to 90/10. In the case where the polyolefin A or the acid-modified product thereof is less than 10 and the polyolefin B or the acid-modified product thereof is more than 90, the polyolefin B or the acid-modified product thereof is not completely dissolved in the polyolefin A or the acid-modified product thereof and thus the chlorination may be uneven. On the other hand, in the case where the polyolefin A or the acid-modified product thereof is more than 90 and the polyolefin B or the acid-modified product thereof is less than 10, the obtained chlorinated polyolefin resin has insufficient cohesive force and thus adhesion to the polyolefin substrate is not necessarily obtained.

[1-4. Melt Viscosity]

The melt viscosity of the chlorinated polyolefin resin at 80° C. is preferably less than 100,000 mPa·s and more preferably less than 70,000 mPa·s. The viscosity of the chlorinated polyolefin resin of the present invention becomes higher as the amount of chlorine becomes higher, and the viscosity increases in a reaction vessel with the progress of chlorination. The chlorinated polyolefin resin having a melt viscosity at 80° C. of 100,000 mPa·s or more results in not flowing at the end of the chlorination reaction. This increases shear strength by a stirrer and thus the dehydrochlorination reaction proceeds, resulting in remarkable coloring of the chlorinated polyolefin resin. The lower limit of the melt viscosity is preferably more than 1,000 mPa·s, more preferably 1,500 mPa·s or more, and further preferably 1,800 mPa·s or more. The chlorinated polyolefin resin having a melt viscosity of 1,000 mPa·s or less is not preferable because physical properties such as a molecular weight and a melting point are relatively low and thus the effect of these physical properties tends to deteriorate adhesion when the chlorinated polyolefin resin is produced.

The melt viscosity at 80° C. can be measured with a cone plate type viscometer (manufactured by BROOKFIELD Corporation, model: CAP200H). A chlorinated polypropylene resin obtained by a conventionally known method in which a chlorinated solvent is used does not melt sufficiently at 80° C. and does not exhibit the melt viscosity.

[1-5. Optional Components]

The raw material composition may include other optional components other than the polyolefin A or the acid-modified product thereof and the polyolefin B or the acid-modified product thereof. Example of the optional components include water, and water is capable of preventing resin coloring during the chlorination reaction and reducing the melt viscosity in some cases.

[2-1. Resin Composition]

The resin composition according to the present invention includes the chlorinated polyolefin resin described above and an organic solvent. The resin composition according to the present invention may include a stabilizer in order to reduce the elimination of chlorine.

Examples of the organic solvent include aromatic solvents such as toluene and xylene; alicyclic hydrocarbon solvents such as cyclohexane and methylcyclohexane; hydrocarbon solvents such as hexane, heptane and octane; ketone solvents such as acetone, methyl ethyl ketone, and methyl isobutyl ketone; ester solvents such as methyl acetate, ethyl acetate, n-propyl acetate, isopropyl acetate, and n-butyl acetate; and glycol solvents such as ethylene glycol, ethyl cellosolve, and butyl cellosolve. Of these organic solvents, toluene, methylcyclohexane, ethyl acetate, propyl acetate, and butyl acetate are preferable.

The concentration of the resin composition (the resin solid content concentration) may be appropriately selected depending on the uses. However, the resin composition having an excessively high or excessively low concentration results in impairing coating workability and thus the concentration is preferably set to 15% by weight to 70% by weight.

As the stabilizer, an epoxy compound is preferable. The epoxy compound is preferably an epoxy compound compatible with the chlorinated polyolefin resin.

Examples of the epoxy compound include an epoxy compound having an epoxy equivalent of about 100 to about 500 and containing one or more epoxy groups in one molecule. More specifically, the following compounds are included:

Epoxidized soybean oil and epoxidized linseed oil prepared by epoxidizing natural vegetable oils having unsaturated groups with peracids such as peracetic acid; epoxidized fatty acid esters epoxidized with unsaturated fatty acids such as oleic acid, tall oil fatty acid, and soybean oil fatty acid; epoxidized alicyclic compounds represented by epoxidized tetrahydrophthalate; compounds prepared by condensing bisphenol A or polyhydric alcohol with epichlorohydrin, for example, bisphenol A glycidyl ether, ethylene glycol glycidyl ether, propylene glycol glycidyl ether, glycerol polyglycidyl ether, and sorbitol polyglycidyl ether; monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, and phenol polyethylene oxide glycidyl ether; metal soaps used as the stabilizer for polyvinyl chloride resins such as calcium stearate and lead stearate; organometallic compounds such as dibutyltin dilaurate and dibutyl malate; and hydrotalcite compounds.

As the stabilizer, these compounds may be used singly or may be used in combination with 2 or more of the compounds.

[2-2. Aqueous Dispersion]

The aqueous dispersion according to the present invention includes the chlorinated polyolefin resin described above and water. The aqueous dispersion of the present invention may include an amphiphilic solvent such as an emulsifier or butyl cellosolve for the purpose of improving dispersion stability.

The concentration of the aqueous dispersion (the resin solid content concentration) may be appropriately selected depending on uses. However, the aqueous dispersion having an excessively high or excessively low concentration results in impairing coating workability and thus the concentration is preferably set to 15% by weight to 50% by weight.

The pH of the aqueous dispersion is preferably 5 or more, and more preferably 7 to 12. The aqueous dispersion having a pH of 5 or more results in preventing the modified polyolefin resin from dispersing in other components due to sufficient neutralization or, even when the modified polyolefin resin is dispersed, preventing storage stability deterioration caused by easily generating sedimentation and separation over time. The aqueous dispersion having a pH of 12 or less can ensure compatibility with other components and operational safety.

The viscosity of the aqueous dispersion at 25° C. measured by a B-type viscometer is preferably 0.1 mPa·s to 1,000 mPa·s, more preferably 1 mPa·s to 700 mPa·s, and further preferably 2 mPa·s to 400 mPa·s.

The viscosity can be measured using the B-type viscometer using a No. 1 or No. 2 rotor at a rotation speed of 60 rpm. In addition, the viscosity is measured using the aqueous dispersion having a solid content concentration of 10% by mass to 60% by mass.

[3. Method for Producing Chlorinated Polyolefin Resin]

The method for producing a chlorinated polyolefin resin according to the present invention is a method including chlorinating the raw material composition including at least the polyolefin A or the acid-modified product thereof and the polyolefin B or the acid-modified product thereof in the absence of an organic solvent. The polyolefin A, the polyolefin B, the raw material composition, and the process of chlorination are as described above.

The phrase "in the absence of an organic solvent" means that an organic solvent that is inevitably mixed is excluded. The organic solvent inevitably mixed refers to a trace amount of organic solvents remaining after removing (for example, distilling off) organic solvents used at the time of acid treatment of the polyolefin A or the polyolefin B or the like by a common method; organic solvents included in the organic peroxide compound; and organic solvents generated by the decomposition of organic peroxides.

EXAMPLES

Hereinafter, the present invention will be described in detail with reference to Examples. The following Examples are intended to suitably describe the present invention and do not limit the present invention. Unless otherwise separately described, the measuring methods of physical property values and the like are measuring methods described above. The term "part" means part by mass, unless otherwise noted.

Production Example 1

To 100 parts of an ethylene-propylene copolymer having the amount of ethylene of about 12% by weight (weight average molecular weight: 60,000, melting point: about 60° C.) produced using a metallocene catalyst as a polymerization catalyst, 2 parts of dicumyl peroxide was added. Thermal cracking was carried out by feeding the mixture to a twin-screw extruder in which the reaction zone temperature was set at 300° C. to give a polyolefin B having a weight average molecular weight of 20,000 and a melting point of about 60° C.

Production Example 2

To 100 parts of an ethylene-propylene copolymer having the amount of ethylene of about 3% by weight (melting point: about 125° C.) produced using the metallocene catalyst as the polymerization catalyst, 4 parts of maleic anhydride and 2 parts of dicumyl peroxide were added. The mixture was fed to the twin-screw extruder in which the reaction zone temperature was set at 250° C. to give an acid-modified product of the polyolefin B that was a maleic anhydride-modified polyolefin having a weight average molecular weight of 50,000 and a melting point of about 125° C.

Example 1

As the polyolefin A, 5 kg of an ethylene-propylene copolymer being a liquid state at normal temperature (viscosity at 40° C.: 340 mPa·s) and, as the polyolefin B, 5 kg of the polyolefin obtained in Production Example 1 (weight average molecular weight: 20,000, melting point: about 60° C.) were poured into a glass-lined reaction vessel. The resultant mixture was sufficiently melted at a temperature of 95° C. and thereafter stirring was started. To this stirred mixture, 5 g of 2,2-azobisisobutyronitrile was added and chlorine gas was blown into the reaction vessel while the internal pressure of the reaction vessel was being controlled to normal pressure or more and 0.2 MPa or less. Thereafter, nitrogen gas was blown into the reaction vessel and hydrogen chloride generated as a by-product was removed to give a chlorinated polyolefin resin. The melt viscosity at 80° C. of the obtained chlorinated polyolefin resin was 2,000 mPa·s. After the pressure in the reaction vessel was set to normal pressure, 400 g of epoxidized soybean oil and 24 kg of toluene were added and the resultant mixture was cooled to room temperature to give a chlorinated polyolefin resin composition having the amount of chlorine of 4%.

Example 2

As the polyolefin A, 1 kg of a liquid ethylene-propylene copolymer at room temperature (viscosity at 40° C.: 1,100 mPa·s) and, as the polyolefin B, 9 kg of an ethylene-propylene copolymer having the amount of ethylene of about 12% by weight which was produced using the metallocene catalyst as the polymerization catalyst (weight average molecular weight: 12,000, melting point: about 60° C.) were poured into a glass-lined reaction vessel. The resultant mixture was sufficiently melted at a temperature of 95° C. and thereafter stirring was started. To this stirred mixture, 5 g of 2,2-azobisisobutyronitrile was added and chlorine gas was blown into the reaction vessel while the internal pressure of the reaction vessel was being controlled to normal pressure or more and 0.2 MPa or less. Thereafter, nitrogen gas was blown into the reaction vessel and hydrogen chloride generated as the by-product was removed to give a chlorinated polyolefin resin. The melt viscosity at 80° C. of the obtained chlorinated polyolefin resin was 67,000 mPa·s. After the pressure in the reaction vessel was set to normal pressure, 400 g of epoxidized soybean oil and 24 kg of n-propyl acetate were added and the resultant mixture was cooled to room temperature to give a chlorinated polyolefin resin composition having a the amount of chlorine of 28%.

Example 3

Except that, as the polyolefin A, 9 kg of a liquid ethylene-propylene copolymer at room temperature (viscosity at 40° C.: 150 mPa·s) and, as the acid-modified product of the polyolefin B, 1 kg of the maleic anhydride-modified polyolefin obtained in Production Example 2 (weight average molecular weight: 50,000, melting point: about 125° C.) were used, the same operation as the operation in Example 2 was performed to give an acid-modified chlorinated polyolefin resin having the amount of chlorine of 43% (melt viscosity at 80° C.: 93,000 mPa·s) and a composition thereof.

Example 4

Except that, as the polyolefin A, 7 kg of hydrogenated polybutadiene (viscosity at 40° C.: 8,000 mPa·s) and, as the polyolefin B, 3 kg of the ethylene-propylene copolymer having the amount of ethylene of about 12% by weight which was produced using the metallocene catalyst as the polymerization catalyst (weight average molecular weight: 60,000, melting point: about 60° C.) were used, the same operation as the operation in Example 2 was performed to give a chlorinated polyolefin resin having the amount of chlorine of 22° (melt viscosity at 80° C.: 40,000 mPa·s) and a composition thereof.

Example 5

As the polyolefin A, 8 kg of an ethylene-propylene copolymer (viscosity at 40° C.: 3,500 mPa·s) and, as the polyolefin B, 2 kg of an ethylene-propylene copolymer having the amount of ethylene of about 12% by weight which was produced using the metallocene catalyst as the polymerization catalyst (weight average molecular weight: 12,000, melting point: about 60° C.) were poured into a glass-lined reaction vessel. The resultant mixture was sufficiently melted at a temperature of 130° C. and thereafter stirring was started. After 100 g of maleic anhydride was added, 30 g of 2,5-dimethyl-2,5-di(t-butylperoxy)hexane was added and the reaction was performed for 4 hours. Thereafter, after the temperature was lowered and controlled to 95° C., 5 g of 2,2-azobisisobutyronitrile was added and chlorine gas was blown in the reaction vessel while the pressure in the reaction vessel was controlled to normal pressure or more and 0.2 MPa or less. Thereafter, nitrogen gas was blown into the reaction vessel and hydrogen chloride generated as the by-product was removed to give an acid-modified chlorinated polyolefin resin. The melt viscosity at 80° C. of the obtained chlorinated polyolefin resin was 3,000 mPa·s. To this resin, 400 g of epoxidized soybean oil and 24 kg of toluene were added and the resultant mixture was cooled to room temperature to give an acid-modified chlorinated polyolefin resin composition having the amount of chlorine of 22%.

Comparative Example 1

The same operation as the operation in Example 2 was performed except that, as the polyolefin A, 10 kg of an ethylene-propylene copolymer being a liquid state at normal temperature (viscosity at 40° C.: 150 mPa·s) was used, and as the polyolefin B, no raw material was used, to give a chlorinated polyolefin resin having the amount of chlorine of 22% (melt viscosity at 80° C.: 1,000 mPa·s) and a composition thereof.

Comparative Example 2

The same operation as the operation in Example 2 was performed using, as the polyolefin A, 1 kg of an ethylene-propylene copolymer being a liquid state at normal temperature (viscosity at 40° C.: 1,100 mPa·s) and, as the polyolefin B, 9 kg of the ethylene-propylene copolymer having the amount of ethylene of about 12% by weight which was produced using the metallocene catalyst as the polymerization catalyst (weight average molecular weight: 12,000, melting point: about 60° C.). Although remarkable coloring occurred at the end stage of the chlorination reaction, a chlorinated polyolefin resin having the amount of chlorine of 46% (melt viscosity at 80° C.: 124,000 mPa·s) and a composition thereof were obtained.

Comparative Example 3

As the polyolefin A, no raw material was used and, as the polyolefin B, 5 kg of the polyolefin obtained in Production Example 1 (weight average molecular weight: 20,000, melting point: about 60° C.) was poured into a glass-lined reaction vessel. The material was sufficiently melted at a temperature of 95° C. and thereafter stirring was started. To this stirred material, 5 g of 2,2-azobisisobutyronitrile was added and chlorine gas was blown into the reaction vessel while the internal pressure of the reaction vessel was being controlled to normal pressure or more and 0.2 MPa or less. However, significant reduction in a chlorine addition ratio due to a high viscosity was observed and the reaction was non-uniform. Consequently, the reaction was not capable of being continued.

Comparative Example 4

As the polyolefin A, 9 kg of an ethylene-propylene copolymer being a liquid state at normal temperature (viscosity at 40° C.: 150 mPa·s) and, as an alternative material of the polyolefin B, 1 kg of thermally cracked polypropylene (weight average molecular weight: 5,000, melting point: about 160° C.) were poured into a glass-lined reaction vessel. Although heating of the mixture was continued at 95° C., a sufficient melting state was not achieved and thus the chlorination reaction was not able to be performed.

Example 6

Except that, as the polyolefin A, 9 kg of an ethylene-propylene copolymer being a liquid state at normal temperature (viscosity at 40° C.: 150 mPa·s) and, as the polyolefin B, 1 kg of an ethylene-propylene copolymer having the amount of ethylene of about 11% which was produced using the metallocene catalyst as the polymerization catalyst (weight average molecular weight: 220,000, melting point: about 65° C.) were used, the same operation as the operation in Example 2 was performed to give chlorinated polyolefin resin having the amount of chlorine of 32% (melt viscosity at 80° C.: 78,000 mPa·s) and a composition thereof.

Comparative Example 5

As an alternative material of the polyolefin A, 8 kg of an ethylene-propylene copolymer (The polymer has no fluidity at 40° C. and thus is impossible to measure a viscosity at 40° C. viscosity at 100° C.: 3,000 mPa·s) and, as the polyolefin B, 2 kg of an ethylene-propylene copolymer having the amount of ethylene content about 12% by weight which was produced using the metallocene catalyst as the polymerization catalyst (weight average molecular weight: 12,000, melting point: about 60° C.) were poured into a glass-lined reaction vessel. The material was sufficiently melted at a temperature of 95° C. and thereafter stirring was started. To this stirred material, 5 g of 2,2-azobisisobutyronitrile was added and chlorine gas was blown into the reaction vessel while the internal pressure of the reaction vessel was being controlled to normal pressure or more and 0.2 MPa or less. However, significant reduction in a chlorine addition ratio due to a high viscosity was observed and the reaction was non-uniform. Consequently, the reaction was not able to be continued.

[Adhesion Test]:

After 120 g of a commercially available resin for gravure printing (manufactured by Sanyo Chemical Industries, Ltd., solid content 30% by weight) and 160 g of titanium dioxide (manufactured by Ishihara Sangyo Kaisha Ltd., rutile type) were diluted with 120 g of a mixed solution of ethyl acetate/isopropyl alcohol (weight ratio 67/33), the mixture was kneaded with a sand mill for 1 hour to prepare an ink.

To 100 parts of the ink, 20 parts of the (acid-modified) chlorinated polyolefin resin composition obtained in Examples 1 to 5 or Comparative Examples 1 and 2 was added and the resultant mixture was sufficiently shaken. Thereafter, the obtained ink was applied to the corona-treated surface of an OPP film (manufactured by Futamura Chemical Co., Ltd., 80 μm) with a Meyer bar No. 5 and dried with a dryer. After allowing to stand at room temperature for one day, a cellophane tape (manufactured by NICHIBAN Co., Ltd., 24 mm) was stuck on the ink-coated surface, and a state of peeling the coated surface when the tape was peeled off at once was examined. The delaminated state was evaluated as follows. The evaluation results are listed in Table 1.

A: No peeling area.
B: A peeling area is less than 50°.
C: A peeling area is 50° or more.
D: Almost all areas are peeled.

[Fluidity at 40° C.]

The polyolefin A was measured using a cone-plate type viscometer (manufactured by BROOKFIELD Corporation, model: CAP200H) to evaluate in accordance with the following criteria.

A: Liquid state is observed at 40° C. and a viscosity can be measured at 40° C.
B: Liquid state is not observed at 40° C. and melt viscosity cannot be measured at 40° C. or the melt viscosity at 40° C. exceeds 100,000 mPa·s.

TABLE 1

| | Polyolefin A | | Polyolefin B | | | | Melt viscosity of chlorinated polyolefin resin at 80° C. (mPa · s) | Adhesion test |
|---|---|---|---|---|---|---|---|---|
| | Fluidity at 40° C. | Type | Mt (° C.) | Weight average molecular weight | A/B (weight ratio) | Amount of chlorine (%) | | |
| Ex. 1 | A | Ethylene-propylene copolymer | 60 | 20,000 | 50/50 | 4 | 2000 | B |
| Ex. 2 | A | Ethylene-propylene copolymer | 60 | 12,000 | 10/90 | 28 | 67000 | A |
| Ex. 3 | A | Ethylene-propylene copolymer | 125 | 50,000 | 90/10 | 43 | 93000 | B |
| Ex. 4 | A | Hydrogenated polybutadiene | 60 | 60,000 | 70/30 | 22 | 40000 | B |
| Ex. 5 | A | Ethylene-propylene copolymer | 60 | 12,000 | 80/20 | 22 | 3000 | A |
| Ex. 6 | A | Ethylene-propylene copolymer | 65 | 222,000 | 90/10 | 32 | 78000 | C |
| Comparative Ex. 1 | A | Ethylene-propylene copolymer | — | — | 100/0 | 22 | 1000 | D |
| Comparative Ex. 2 | A | Ethylene-propylene copolymer | 60 | 12,000 | 10/90 | 46 | 124000 | D |

TABLE 1-continued

|  | Polyolefin A | | Polyolefin B | | | | Melt viscosity of chlorinated polyolefin resin at 80° C. (mPa·s) | Adhesion test |
|---|---|---|---|---|---|---|---|---|
|  | Fluidity at 40° C. | Type | Mt (° C.) | Weight average molecular weight | A/B (weight ratio) | Amount of chlorine (%) | | |
| Comparative Ex. 3 | — | — | 60 | 20,000 | 0/100 | Impossible to prepare | — | — |
| Comparative Ex. 4 | A | Ethylene-propylene copolymer | 160 | 5,000 | 90/10 | Impossible to prepare | — | — |
| Comparative Ex. 5 | B | Ethylene-propylene copolymer | 60 | 12,000 | 80/20 | Impossible to prepare | — | — |

As can be seen from Table 1, the chlorinated polyolefin resins were produced from the raw material composition including the polyolefin A and the polyolefin B in the absence of an organic solvent (Examples 1 to 6).

The chlorinated polyolefin resin using the polyolefin A alone exhibited poor adhesion (Comparative Example 1). The chlorinated polyolefin resin having the amount of chlorine of more than 45% by weight exhibited poor adhesion even when the raw material composition including the polyolefin A and the polyolefin B was used and chlorination was performed in the absence of an organic solvent (Comparative Example 2).

In the case of chlorination of the polyolefin B alone, the chlorinated polyolefin resin was not able to be prepared in the case where the melting point of the polyolefin B is more than 150° C. or the polyolefin had no fluidity at 40° C., even when the raw material composition including the polyolefin A and the polyolefin B was used (Comparative Examples 3 to 5).

The invention claimed is:

1. A chlorinated polyolefin resin, comprising:
an amount of chlorine of in a range of from 1 to 45 wt. %,
wherein the resin is obtained by chlorinating a raw material composition in the absence of an organic solvent,
wherein the raw material composition comprises
a polyolefin A or an acid-modified product thereof having fluidity at 40° C. or less and
a polyolefin B or an acid-modified product thereof having a melting point in a range of from more than 40 to 150° C. or less.

2. The resin of claim 1, having a melt viscosity at 80° C. of less than 100,000 mPa·s.

3. The resin of claim 1, wherein a weight average molecular weight of the polyolefin B is less than 250,000.

4. The resin of claim 1, wherein the raw material composition comprises the polyolefin A and the acid-modified product of the polyolefin B.

5. A resin composition, comprising:
the resin of claim 1; and
an organic solvent.

6. An aqueous dispersion, comprising:
the resin of claim 1; and
water.

7. A method for producing the resin of claim 1, the method comprising:
chlorinating the raw material composition in the absence of an organic solvent,
wherein the raw material composition comprises the polyolefin A or the acid-modified product thereof and the polyolefin B or the acid-modified product thereof.

8. The resin of claim 1, wherein the raw material composition comprises the acid-modified product of the polyolefin A and the acid-modified product of the polyolefin B.

* * * * *